Aug. 7, 1934.　　　C. K. PEVEAR　　　1,969,276
MERCHANDISE HANDLING SYSTEM
Filed Oct. 24, 1930　　3 Sheets-Sheet 1

INVENTOR
C. Keith Pevear.
by H.W.[illegible]
Atty

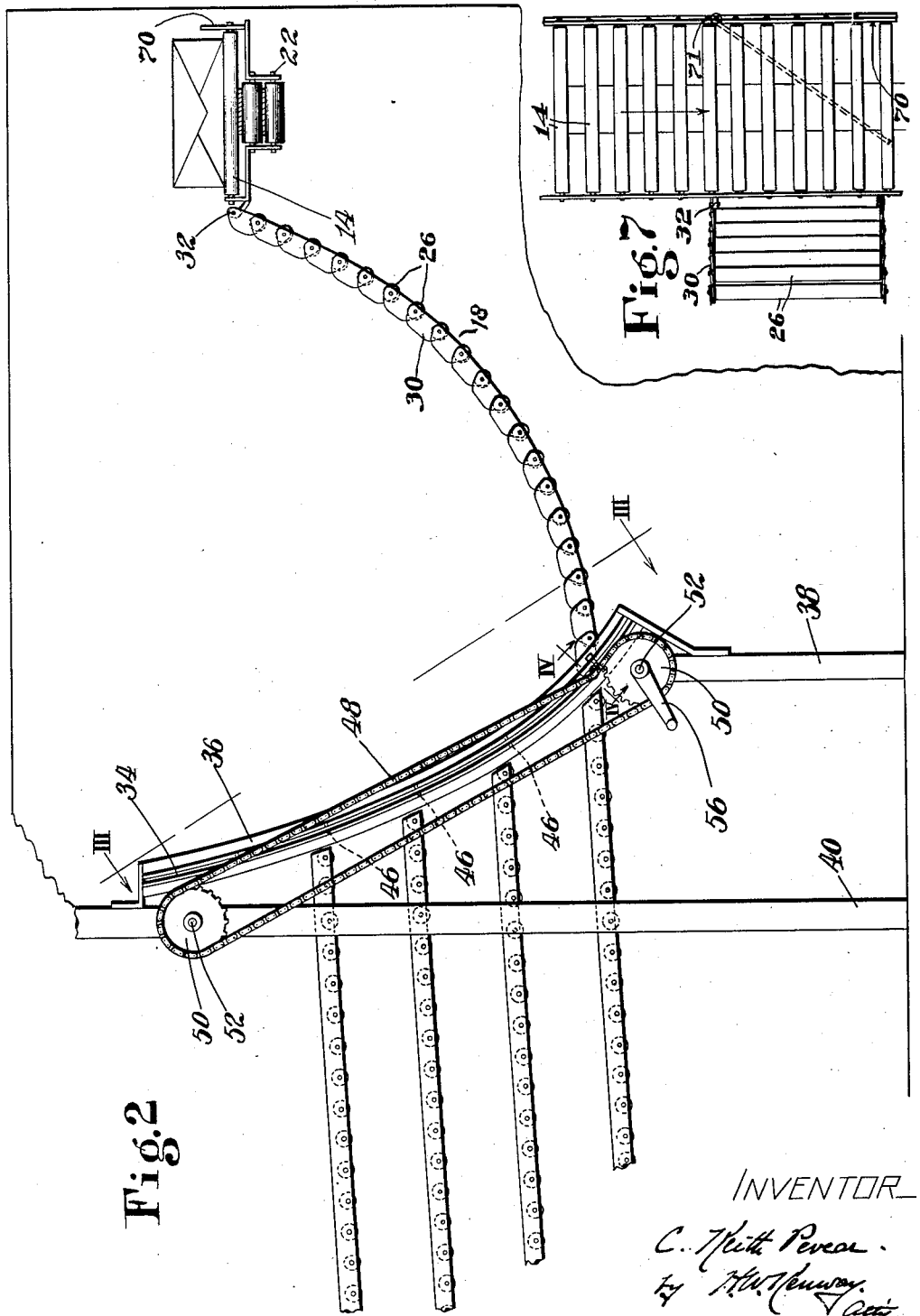

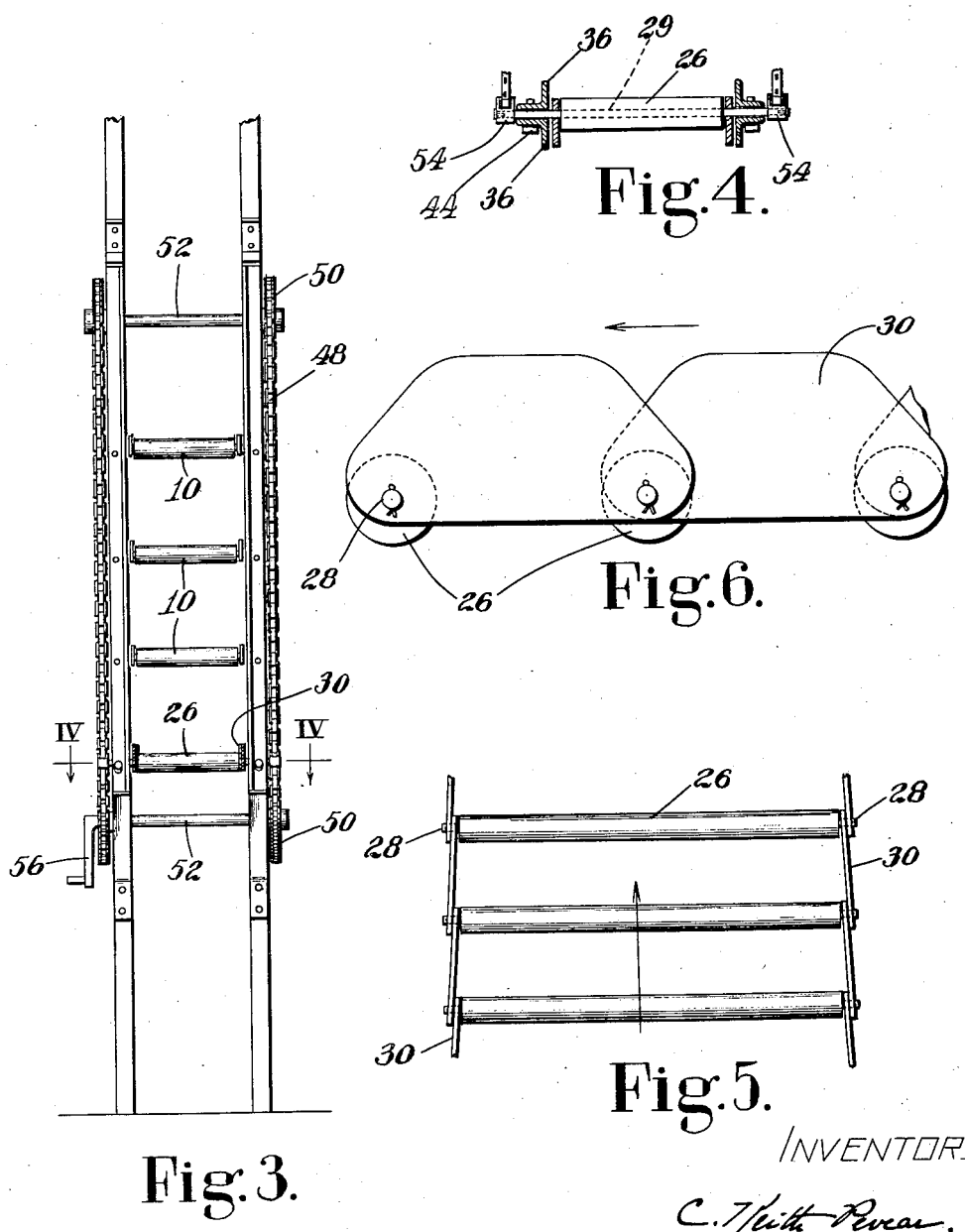

Patented Aug. 7, 1934

1,969,276

UNITED STATES PATENT OFFICE 1,969,276

MERCHANDISE HANDLING SYSTEM

Chase Keith Pevear, New York, N. Y.

Application October 24, 1930, Serial No. 490,940

13 Claims. (Cl. 193—35)

This invention relates to merchandise handling systems, and more especially to a novel flexible conveyor for use in delivering merchandise to and discharging it from systems wherein it may be stored or transported at different levels. Such merchandise as packing cases is today handled most speedily and economically by continuous conveyors but the loading or delivering of merchandise on the conveyors from different locations or elevations and the unloading or discharging thereof to different locations requires a considerable amount of manual labor. The primary object of my invention is to provide a flexible conveyor or conveyor connection of novel construction by which merchandise may be speedily and economically delivered to such a conveyor from different sources of supply or in like manner distributed from the conveyor to different locations for storage or different discharge routes.

One important field of use for my invention is in connection with a series of storage conveyors arranged vertically one above another and in this organization I contemplate a flexible conveyor connection adjustable to varying positions to serve any selected conveyor of the series. In the storing and handling of boxes and the like, the boxes are commonly brought successively into the storage room on a continuous conveyor and distributed therefrom to one end of the storage conveyor system which may extend across the room, the boxes being thereafter moved along and held on the storage conveyors and discharged from the other ends thereof as needed. If the incoming amount of merchandise becomes greater than the outgoing amount and more storage capacity is needed than the conveyor system affords, the boxes are sometimes removed from the conveyors and piled in the adjacent areas. The flexible conveyor connection of my invention serves to deliver boxes or other merchandise to whichever storage conveyor of the system the operator may select. For example, boxes may be delivered to the lowermost storage conveyor until that is filled to capacity, whereupon the flexible conveyor may be adjusted to deliver boxes to the second storage conveyor of the series, and so on. If the boxes are being piled beside the storage conveyors, then they may be delivered at different levels to the conveyor as the height of the pile increases.

My improved conveyor is in the nature of a flexible chain made up of links between which are mounted conveyor rolls, the links preferably being of such dimensions as to act as side rails for the conveyor and the ends thereof overlapping in a manner providing a free and unobstructed passage for the merchandise. The invention further contemplates means for supporting and adjusting the movable end of the conveyor to its different receiving or distributing locations and this means may be conveniently in the form of a guideway supporting the end of the conveyor and cooperating means for moving the same along the guideway to and holding it in any selected location.

These and other features of the invention will be best understood and appreciated from the following description of a preferred embodiment thereof, selected for purposes of illustration and shown in the accompanying drawings, in which Fig. 1 is a view in side elevation of a gravity conveyor system embodying my invention, parts being broken away;

Fig. 2 is a view in side elevation, on an enlarged scale, of the supply end of the system;

Fig. 3 is an end view partly in section on the plane III—III of Fig. 2;

Fig. 4 is a sectional view taken on lines IV—IV of Figs. 2 and 3;

Fig. 5 is a fragmentary plan view of the flexible conveyor;

Fig. 6 is a side elevation thereof; and

Fig. 7 is a fragmentary plan view of a portion of the conveyor system.

Figure 1:
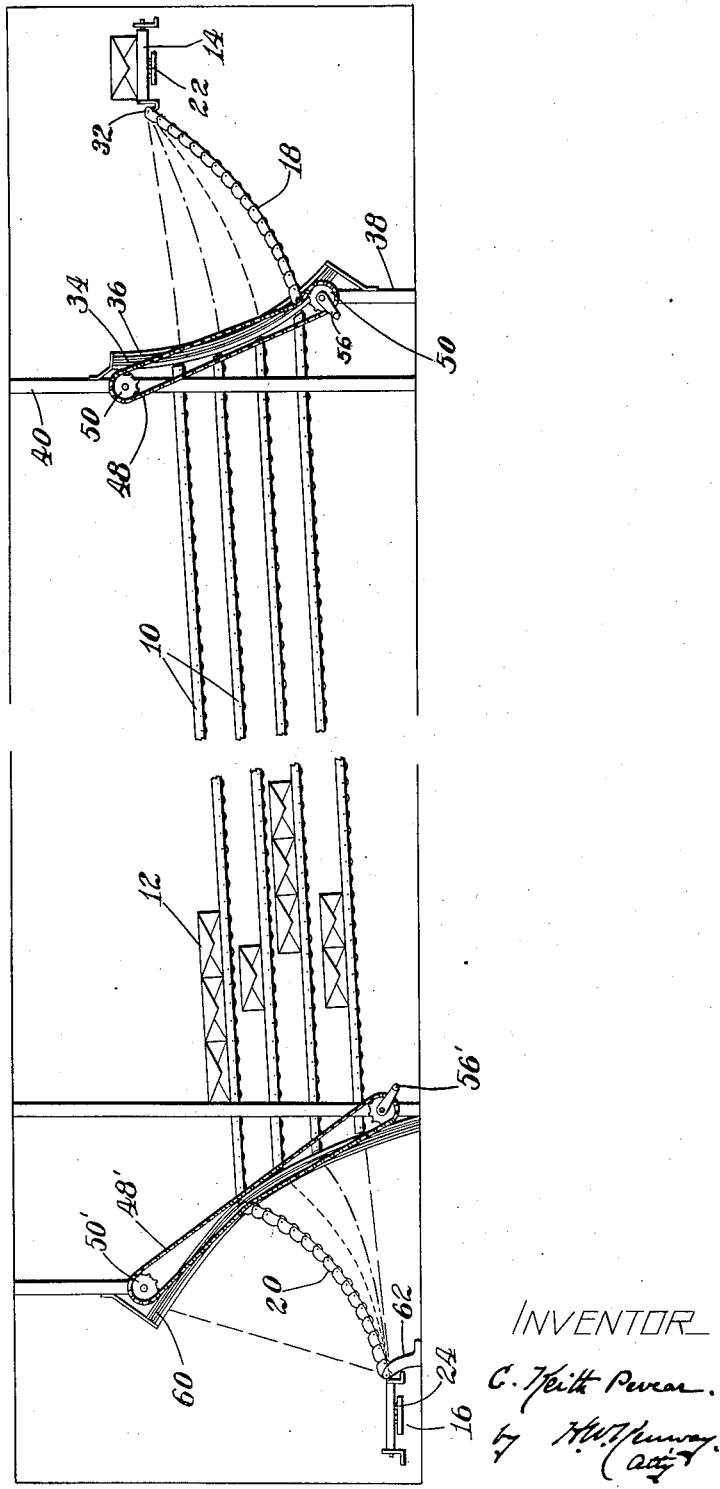

As has been above stated, my invention particularly contemplates a novel flexible conveyor for handling boxes and like merchandise with greater efficiency and security and while the invention is particularly applicable to the conveying of merchandise to and from different locations, an example of which is illustrated and described herein, it will be understood that the invention will, of course, have other useful applications. My new flexible conveyor is particularly useful in providing conveyor connections between the receiving and discharging ends of storage conveyors located at different levels and supply and discharge conveyors respectively. This application of the invention has, therefore, been illustrated in the accompanying drawings and will now be described.

In Fig. 1 of the drawings is illustrated a storage room or bay through which extends a series of storage conveyors 10 slightly inclined from right to left. Merchandise, such as the packed boxes 12, is delivered to several of these bays by means of a supply conveyor 14 extending transversely past the higher or receiving ends of the storage conveyors. The boxes are distributed from this conveyor 14 onto the storage conveyors, down which they are carried by gravity to the other ends thereof and from which ends they are taken as needed and carried from the room by means of a discharge conveyor 16. The conveyors 10 are relatively long and support a large number of boxes in storage but if the incoming amount becomes greater than the outgoing amount and more storage capacity is needed, some of the boxes may be piled onto the floor adjacent to the storage conveyors, it being understood that such boxes may be conveniently taken from the higher conveyors 10 as the piles on the floor rise. My invention particularly concerns an improved flexible conveyor forming a conveyor connection 18 from the supply conveyor 14 to the storage conveyors and a conveyor connection 20 from the storage conveyors to the discharging conveyor 16. The conveyors 14 and 16 may be live roller conveyors in which the rollers are driven by belts 22 and 24. It will be noted that these conveyors 14 and 16 are respectively higher than the receiving ends of the storage conveyors and lower than the delivery ends thereof.

The flexible conveyors 18 and 20 each comprises a plurality of freely rotatable rolls 26 supported at their ends on center rods 28 by links 30, a pair of such links connecting each two adjacent rolls and the rear ends of each such pair overlapping the front ends of the next rearwardly adjacent pair. The links also preferably extend upwardly to a sufficient height above the rolls to provide side rails for the conveyor. This construction is best illustrated in Figs. 5 and 6, wherein arrows indicate the direction of travel of the merchandise along the conveyor. The side rails keep the merchandise on the conveyor and the overlapping of the links in the manner illustrated and described provides a free and unobstructed passageway therebetween.

One end of the conveyor 18 has its end roller or links connected at 32 to one side support of the conveyor 14. The other end thereof extends between a pair of curved guideways 34 formed by two pairs of relatively spaced angle irons 36. These angle irons are supported at their ends by posts 38 and 40 and they extend in an inclined and upwardly curved path past the receiving ends of the conveyors 10 which are staggered as shown in Fig. 2. The endmost roller 26 of the flexible conveyor is located between the guideways 34, as shown in Fig. 4, and the ends of the supporting rod 29 thereof extend into the two guideways formed by the two pairs of angle irons 36. As thus mounted, this end of the flexible conveyor can be adjusted along the guideways into alignment with any of the storage conveyors 10 and may be held in any of such positions by pins 44 engaging through aligned holes 46 in the angle irons. These several positions are indicated in broken lines in Fig. 1 and it will be clear that in such positions the flexible conveyor forms a conveyor connection from the supply conveyor 14 to any one of the storage conveyors 10.

I prefer to provide some means for adjusting the flexible conveyor along the guideways 34 and the means illustrated herein for this purpose comprises a pair of endless chains 48 extending over sprockets 50 on the ends of a pair of shafts 52 located respectively at the ends of the guideways. The extreme ends of the rod 29 are engaged by a pair of elements 54 respectively connected to the two chains 48. Movement of the chains by means of a handle 56 on one of the shafts is adapted to move the conveyor 18 along the guideways, as will be understood, the same being secured in the desired position by means of the pins 44.

The flexible conveyor connection 20 and the mechanism cooperating therewith are substantially the same as that of the connecting conveyor 18 and above described, except that the angle irons and their guideways 60 are pitched to a somewhat different angle due to the lower elevation of the conveyor 16. The lower end of this connection 20 is secured to a fixture 62 adjacent to the conveyor 16 and the upper end thereof is carried by the chain 48' in the guideways 60. The remaining parts of this device at the left-hand end of Fig. 1, which corresponds to like parts at the right-hand end of Fig. 1, are designated herein and on the accompanying drawings by the same reference characters primed.

The construction and operation of the device and particularly the advantages of my improved flexible conveyor are believed to be obvious. The incoming boxes 12 are carried along on the conveyor and are to be distributed therefrom to the several storage conveyors 10 in the several bays of the building. The connecting conveyor 18 is first adjusted by means of the handle 56 into alignment with the particular storage conveyor 10 which is to receive the boxes. Then, as a box reaches a position opposite the connecting conveyor 18, it is forced off the conveyor 14 and onto the connecting conveyor 18. Any convenient means may be provided for performing this operation and I have in Fig. 7 illustrated a gate 70 pivoted at 71 to one side of the conveyor 14 and adjustable to a position wherein the boxes engaging thereagainst will be forced off the conveyor 14 and onto the convey 18.

When a box tips from the conveyor 14 onto the conveyor 18, it rides downwardly over the rolls 26 by gravity. In its lowermost position, shown in Fig. 1, the conveyor 18 has sufficient slack to be depressed by the weight of the box and thereby prevent the box from riding down the conveyor with excessive speed. The guideway 34 is so curved that as the adjustable end of the conveyor is raised to the higher elevations, the conveyor straightens out so as to leave less slack and thereby permit freer movement of the load thereon. The shape and overlapping arrangement of the links, as shown in Figs. 5 and 6, are such that the links form a guiding rail at the edges of the conveyor without any possibility of digging into or interfering with the progress of the boxes, and as the boxes reach the conveyor 10 the conveyor 18 will automatically assume a position in alignment with such conveyor 10 whereby the boxes will ride freely thereonto. A straight and rigid conveyor connection would obviously form such an angle with the lower conveyors 10 as to cause the boxes to dig into the rollers thereof at the junction of the two conveyors and such a rigid conveyor connection would also permit the boxes to drop with excessive speed.

The operation of the conveyor connection 20 is very similar to that of the conveyor 18. The adjustable end is elevated into alignment with the shelf 10 from which it is desired to remove boxes. The boxes are then permitted to ride one at a time onto the conveyor 20, which carries them downwardly onto the conveyor 16, whereby they are transported outwardly of the storage room. It will be noted that this conveyor 20 can be elevated into a relatively high and out-of-the-way position, shown in broken lines in Fig. 1, when not in use, thus leaving a free passageway therebeneath.

Having thus described my invention, what I claim as new and desire to secure by Letters Patent is:

1. A merchandise handling system, comprising a supply conveyor, a discharge conveyor, a series of parallel intermediate conveyors, and two flexible conveyor connections located respectively at the ends of said series for connecting the supply and discharge conveyors to any selected intermediate conveyor.

2. A merchandise handling system, comprising a supply conveyor, a discharge conveyor, a series of intermediate storage conveyors arranged one above another, and two flexible conveyor connections located respectively at the ends of the series for connecting any selected storage conveyor to the supply and discharge conveyors.

3. A merchandise handling system, comprising a series of elongated conveyors arranged one above another, a supply conveyor above and relatively spaced from one end of said series, a discharge conveyor below and relatively spaced from the other end of said series, and means providing flexible conveyor connections between the supply and discharge conveyors and the adjacent ends of the elongated conveyors.

4. A merchandise handling system, comprising a supply conveyor, a discharge conveyor, a series of intermediate storage conveyors arranged one above another, flexible conveyor connections respectively located at the ends of the series and connected to the supply and discharge conveyors, and means for adjusting the series conveyor ends of said flexible connections to serve any conveyor of the series and hold the same in such position.

5. A flexible conveyor comprising a plurality of transversely extending rolls of a length substantially equal to the width of the conveyor, links rotatably connecting and supporting the rolls at their ends in relatively spaced relation, and means for supporting the conveyor at its ends, the links being pivotally connected to each other at the axes of the rolls intermediate said ends of the conveyor.

6. A flexible conveyor comprising a plurality of rolls, links at the ends of the rolls rotatably connecting and supporting the rolls in relatively spaced relation, the links extending upwardly above the rolls to an extent forming side guards for the conveyor, and means for supporting the conveyor at its ends.

7. A flexible conveyor comprising a plurality of rolls, links at the ends of the rolls connecting and rotatably supporting the rolls in relatively spaced relation, the forward end of each link being overlapped at its outer face by the rear end of the adjacent link, and means for supporting the conveyor at its ends.

8. A flexible conveyor comprising a plurality of rolls, means connecting and rotatably supporting the rolls in relatively spaced relation in a manner rendering the conveyor flexible about the axes of the rolls, means supporting one end of the conveyor, separate means for adjustably supporting the other end thereof whereby it may be moved to different locations as permitted by the flexibility of the conveyor, and means providing side guards extending above the rolls on the conveyor.

9. A flexible conveyor comprising a plurality of rolls, means connecting and rotatably supporting the rolls in relatively spaced relation in a manner rendering the conveyor flexible from end to end about the axes of the rolls, means adjustably supporting one end of the conveyor, means cooperating with the supporting means for moving the said end to different locations within the range permitted by the flexibility of the conveyor, and means providing side guards extending above the rolls on the conveyor.

10. A flexible conveyor comprising a plurality of rolls, means rotatably connecting and supporting the rolls in relatively spaced relation in a manner rendering the conveyor flexible about the axes of the rolls, means supporting one end of the conveyor, a guideway extending in the direction of said transverse flexibility of the conveyor, and means supporting the other end of the conveyor in the guideway in such manner that it may be adjusted to and held in different positions therealong.

11. A flexible conveyor comprising a plurality of rolls, means rotatably connecting and supporting the rolls in relatively spaced relation in a manner rendering the conveyor flexible about the axes of the rolls, means supporting one end of the conveyor, a guideway supporting the other end thereof, and means for moving said end to different positions along the guideway.

12. A merchandise handling system comprising a series of storage conveyors arranged one above another, the series being interposed between a delivering conveyor and a discharging conveyor, a flexible connecting conveyor leading from the delivering conveyor to the series of storage conveyors and a second flexible conveyor leading from the series of storage conveyors to the discharging conveyor, means for independently adjusting the flexible conveyors whereby one storage conveyor may be served from the delivering conveyor and another storage conveyor connected with the discharging conveyor.

13. A merchandise handling system comprising a series of storage conveyors arranged one above another and inclined from one end to the other, delivering and discharging conveyors located respectively at opposite ends of the series, a flexible connecting conveyor adjustably located between the delivering conveyor and the higher end of the series of storage conveyors, and a second flexible conveyor located between the lower end of the storage conveyors and the discharging conveyor and independently adjustable to serve any selected storage conveyor.

CHASE KEITH PEVEAR.